(12) United States Patent
Lee et al.

(10) Patent No.: US 8,396,981 B1
(45) Date of Patent: Mar. 12, 2013

(54) GATEWAY FOR CONNECTING STORAGE CLIENTS AND STORAGE SERVERS

(75) Inventors: Whay Sing Lee, Milpitas, CA (US); Richard W. Meyer, Redwood City, CA (US); Charles D. Binford, Wichita, KS (US); Rodney A. Dekoning, Wichita, KS (US); William Stronge, Westford, MA (US)

(73) Assignee: Oracle America, Inc., Redwood City, CA (US)

(*) Notice: Subject to any disclaimer, the term of this patent is extended or adjusted under 35 U.S.C. 154(b) by 2608 days.

(21) Appl. No.: 11/147,071

(22) Filed: Jun. 7, 2005
(Under 37 CFR 1.47)

(51) Int. Cl.
*G06F 13/42* (2006.01)
*G06F 13/00* (2006.01)

(52) U.S. Cl. ........ 709/232; 709/234; 709/230; 709/250; 709/203

(58) Field of Classification Search ............... 709/203, 709/206, 225–244, 250; 710/315
See application file for complete search history.

(56) References Cited

U.S. PATENT DOCUMENTS

| | | | |
|---|---|---|---|
| 5,941,972 A | 8/1999 | Hoese et al. | |
| 6,041,381 A | 3/2000 | Hoese | |
| 6,421,753 B1 | 7/2002 | Hoese et al. | |
| 6,425,035 B2 | 7/2002 | Hoese et al. | |
| 6,425,036 B2 | 7/2002 | Hoese et al. | |
| 6,738,854 B2 | 5/2004 | Hoese et al. | |
| 6,763,419 B2 | 7/2004 | Hoese et al. | |
| 6,789,152 B2 | 9/2004 | Hoese et al. | |
| 6,912,566 B1 * | 6/2005 | Barrenscheen et al. | 709/215 |
| 7,421,543 B2 * | 9/2008 | Suzuki | 711/147 |
| 7,953,100 B2 * | 5/2011 | Selitser et al. | 370/401 |
| 2002/0124066 A1 * | 9/2002 | Chang et al. | 709/223 |
| 2003/0079019 A1 * | 4/2003 | Lolayekar et al. | 709/226 |
| 2003/0105830 A1 * | 6/2003 | Pham et al. | 709/216 |
| 2003/0145230 A1 * | 7/2003 | Chiu et al. | 713/201 |
| 2004/0037319 A1 * | 2/2004 | Pandya | 370/469 |
| 2004/0054748 A1 * | 3/2004 | Ackaouy et al. | 709/214 |
| 2004/0215831 A1 * | 10/2004 | Shoji et al. | 709/249 |
| 2005/0216668 A1 * | 9/2005 | Kobayashi et al. | 711/118 |
| 2006/0075067 A1 * | 4/2006 | Blackmore et al. | 709/217 |
| 2006/0083246 A1 * | 4/2006 | Minami et al. | 370/395.31 |
| 2006/0165084 A1 * | 7/2006 | Makhervaks et al. | 370/394 |
| 2006/0235977 A1 * | 10/2006 | Wunderlich et al. | 709/227 |
| 2006/0259625 A1 * | 11/2006 | Landfeldt et al. | 709/227 |
| 2006/0262797 A1 * | 11/2006 | Biran et al. | 370/392 |
| 2007/0041383 A1 * | 2/2007 | Banikazemi et al. | 370/395.3 |
| 2007/0273919 A1 * | 11/2007 | Oomura | 358/1.15 |

* cited by examiner

*Primary Examiner* — Kenneth R Coulter
(74) *Attorney, Agent, or Firm* — Marsh Fischmann & Breyfogle, LLP; Libby A. Huskey; Kent A. Lembke

(57) ABSTRACT

The invention provides a networking system, network system gateway, and method for managing the transfer of data between networks interconnected through the gateway. The gateway manages the communication paths and commands used in transferring data, as well as the logins associated with each network. The gateway further provides the ability to buffer data in order to accommodate latencies within the networks. Additionally, the gateway provides the ability to pipeline data across the networks.

10 Claims, 6 Drawing Sheets

GATEWAY FOR CONNECTING STORAGE CLIENTS AND STORAGE SERVERS

BACKGROUND OF THE INVENTION

1. Field of the Invention

The present invention relates to a networking system and method and more particularly to a networking system having a gateway for managing the passing of data between multiple networking systems.

2. Description of Related Art

Various networking systems are currently available, many of which are combined to create larger integrated systems. Many networking systems use differing communication methods and protocols. For example, Ethernet is an industry standard, highly scalable, high performance interconnection fabric, which may be used to connect together a large number of nodes performing a variety of functions. One such function is as a scalable data storage server that accepts data storage commands from storage clients and performs a variety of transforms on such commands and subsequently issues derived data storage commands to storage devices such as disk drives.

The interface used to request block storage services for most networks is the Small Computer Systems Interface, or SCSI. SCSI is a client-server architecture and a SCSI transport maps the client-server SCSI protocol to a specific interconnect. One such SCSI transport is Internet SCSI, or iSCSI. iSCSI is a mapping of the SCSI remote procedure call over the TCP (Transmission Control Protocol).

The SCSI layer builds and receives SCSI CDBs (Command Descriptor Blocks) and passes/receives them and their parameters to/from the iSCSI layer. The iSCSI layer builds/receives iSCSI PDUs (Protocol Data Unit) and relays them to/from one or more TCP connections. One or more TCP connections that link an initiator with a target form a session. Connections within a session are identified by a CID (connection ID). Sessions are identified by the SID (session ID). For any iSCSI request issued over a TCP connection, the corresponding response and/or other PDUs must be sent over the same connection. This is called command connection allegiance. Thus, if an initiator sends a READ command, the target must send the requested data and the status to the initiator over the same TCP connection that was used to deliver the SCSI command.

ISCSI Extensions for RDMA (iSER) provides a Remote Direct Memory Access ("RDMA") capability to iSCSI by layering iSCSI on top of Remote Direct Memory Access Protocol (RDMAP). RDMAP permits data to be transferred directly in and out of buffers without intermediate data copy operations.

The interconnection between a storage client or storage device and a storage server system, such as an Ethernet network, may be of a different type of interconnection fabric. For example, storage client networks, as well as storage device networks, may be made up of a Fiber Channel interconnection fabric.

Standard protocols do not provide effective connectivity from one interconnection fabric, such as a Fiber Channel based client or storage device, to a storage server constructed of another interconnection fabric, such as Ethernet. That is, the translation from one protocol to another is not accounted for in standard protocols. Furthermore, the transfer of data typically needs to be completed within one fabric/protocol before beginning the transfer in the second fabric/protocol compromising performance and resource utilization efficiency.

These and other deficiencies exist in current networked server systems. Therefore, a solution to these and other problems is needed to provide a data storage server system capable of transmitting data and command information between differing protocols.

SUMMARY OF THE INVENTION

Accordingly, the present invention is directed to a network system gateway and a method for managing the passing of data between multiple networking systems. The advantages of the invention will be realized and attained by the structure particularly pointed out in the written description and claims hereof, as well as the appended drawings.

Thus, the present invention provides a networking system gateway and a communication management concept enabling improved communication between interconnection fabrics using differing communication protocols. Accordingly, a network server system utilizes a gateway for interconnecting with other network systems, such as client or storage device systems. The networking system gateway also manages the pipelining of data bursts across multiple fabrics and is capable of sending bursts in one fabric before it has finished receiving all of the bursts from the other fabric.

In accordance with one embodiment of the present invention, a system for managing the passing of data between multiple networking systems is provided that includes a gateway node, a first network node, a second network node, and communication paths for communicating control and data packets between the gateway node and the first and second network nodes. The gateway node receives and responds to data requests, translates a received data request, and initiates data transfer operations based on the received data request.

In accordance with another embodiment of the present invention, a method for processing a data write request is provided including the steps of receiving a first write request by a gateway module for writing data to a network node, converting the first write request to a second write request, passing the second write request to the network node, generating a first transfer request based upon the first write request, passing the first transfer request to the gateway module, generating one or more second transfer requests by the gateway module, passing the one or more second transfer requests, passing the data specified in each of the one or more second transfer requests with one or more corresponding first data transfer messages to the gateway module, passing the specified data from each of the one or more first data transfer messages with one or more corresponding second data transfer messages by the gateway module, responding with a first status message to the gateway module indicating the result of the step of passing the specified data, and sending a second status message by the gateway based on the first status message.

In accordance with a further embodiment, the present invention provides a method for processing a data read request including the steps of receiving a first read request by a gateway module for reading specified data from a network module, converting the first read request to a second read request, passing the second read request to the network module, responding with one or more first data transfer messages with the specified data identified in the first read request, generating one or more second data transfer messages for each of the one or more first data transfer messages, passing the one or more second data transfer messages, responding with a first status message to the gateway module indicating the result of the step of responding with one or more first data transfer messages, and sending a second status message by the gateway based on the first status message.

In a further embodiment, the present invention provides a method for processing a data read request including the steps of receiving a read request for a specified amount of data, converting the read request to a read command, determining the amount of the specified data that can be sent in a remote direct memory access write command, generating a remote direct memory access write command based on the step of determining the amount of the specified data, sending the remote direct memory access write command, writing the data received in the step of sending the remote direct memory access write command, determining if the specified amount of data has been sent, repeating the steps of generating a remote direct memory access write command, sending the remote direct memory access write command, and writing the data received, if the specified amount of data has not been sent, responding with a status response indicating the status of the direct memory access write commands, and passing a status message indicating the status of the direct memory access write commands.

In another embodiment, the present invention provides a method for processing a data write request is provided that includes the steps of receiving a write request for a specified amount of data, converting the read request to a read command, responding with a remote direct memory access read request for the specified amount of data, determining the amount of the specified data that can be retrieved, requesting the amount of the specified data identified in the step of determining the amount of the specified data, writing the amount of data requested in the step of requesting the amount of the specified data, generating a remote direct memory access read command with the data received in the step of writing the amount of memory requested, determining if the specified amount of data has been sent, repeating the steps of requesting the amount of the specified data, writing the amount of data, and generating a remote direct memory access read command with the data received, if the specified amount of data has not been sent, responding with a status response indicating the status of the direct memory access read commands, and passing a status message indicating the status of the direct memory access read commands.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention are incorporated in and constitute a part of this specification, illustrate embodiments of the invention and together with the description serve to explain the principles of the invention.
In the drawings.

DETAILED DESCRIPTION OF VARIOUS EMBODIMENTS

Reference will now be made in detail to various embodiments of the present invention, examples of which are illustrated in the accompanying drawings.

Figure 1:
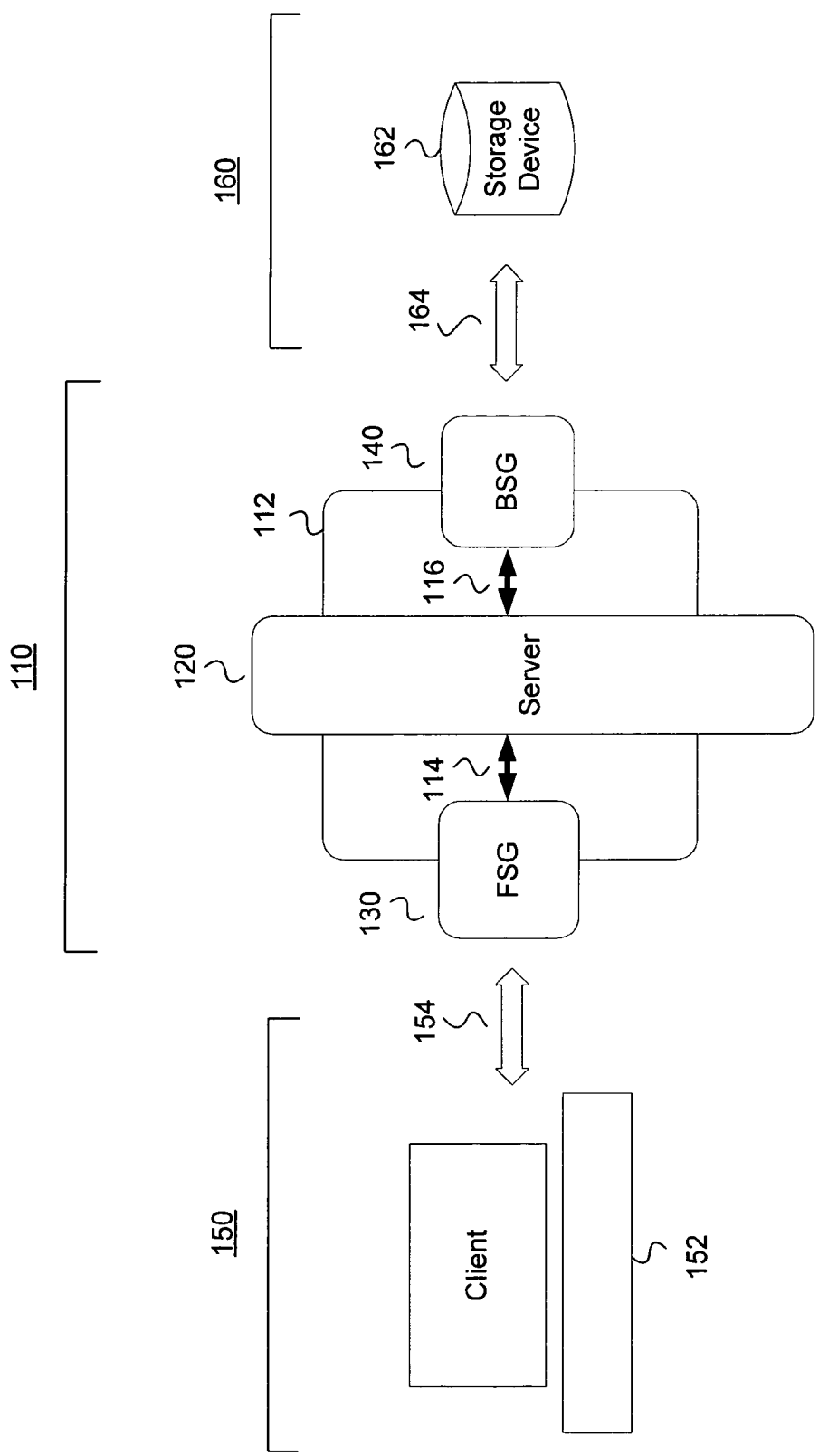
FIG. 1 shows a networking system, including a server system, with a front-side gateway node connected to a client system, and a back-side gateway node connected to a data storage system in accordance with an embodiment of the present invention.

FIG. 1 shows a networking system, including a server system, with a front-side gateway node connected to a client system and a back-side gateway node connected to a data storage system, in accordance with an embodiment of the present invention. The server system 110 is made up of various nodes, including one or more server nodes 120, one or more front-side gateway nodes ("FSG") 130, and one or more back-side gateway nodes ("BSG") 140. The nodes are clustered or connected through an interconnection fabric 112. During read and write operations a communication path 114 or 116 is established between a server node 120 and a FSG 130 or BSG 140.

FIG. 1 also shows a client system 150 that includes one or more clients 152 that access the server system 110 through interconnection fabric 154. The FSG 130 of server system 110 provides a communication management and translation mechanism between the server system 110 and the client system 150.

FIG. 1 also shows a storage device system 160 that includes one or more storage devices 162 interconnected with the server system 110 through interconnection fabric 164. The BSG 140 of server system 110 also provides a communication management and translation mechanism between the server system 110 and the storage device system 160.

Figure 2:
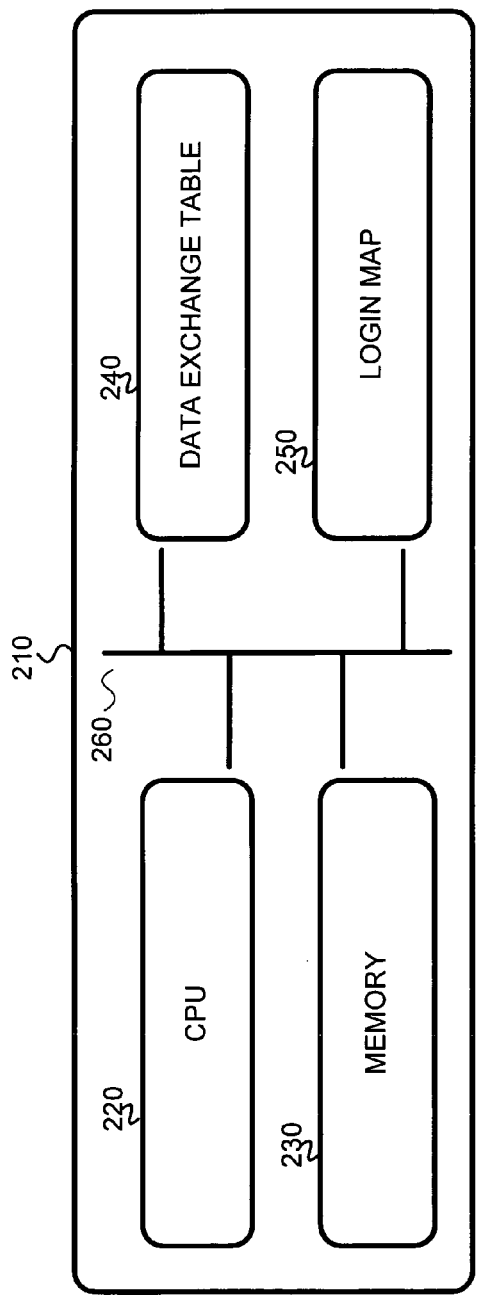
FIG. 2A is a detailed diagram of a front-side gateway, including a processing unit, memory, a data exchange table, and a login map, according to an embodiment of the present invention.
FIG. 2B is a detailed diagram of a data exchange table, according to an embodiment of the present invention.
FIG. 2C is a detailed diagram of a login map, according to an embodiment of the present invention.

FIG. 2A shows a detailed view of a gateway node, according to an embodiment of the present invention. Turning to FIG. 2A, gateway node 210 includes a processing unit 220, memory 230, data exchange table 240, and login map 250 logically interconnected through communication path 260. The data exchange table 240 tracks the communication paths on the client- or storage-network side to ensure that the responses from the server side are sent to the appropriate request. The login map 250 is used to determine how the client or the storage device and the server login sessions are mapped to each other. The memory 230 may be used to store commands or data as they are transferred between a client and a server or server and storage device. According to one embodiment, memory 230 is used as a first in/first out queue to buffer and control command and data flow through the gateway.

Returning to FIG. 1, in operation, the FSG 130 acts as a target as it relates to the clients 152, as well as an initiator as it relates to the server nodes 120. Similarly, the BSG 140 acts as a target as it relates to server nodes 120, and as an initiator as it relates to the storage devices 162. For each command the FSG 130 receives from the client system 150, the FSG 130 issues exactly one corresponding command to the server nodes 120. Likewise, for each command received by the BSG 140 for the server nodes 120, the BSG 140 issues exactly one corresponding command to the storage device 162.

For example, in an iSER based server system the FSG 130 would relay the given SCSI parameters, such as the logical address of the data block to be accessed, the amount of data being requested, etc. For each iSER response message it subsequently receives, the FSG 130 also delivers exactly one status report to the client 152, relaying the given status indicating if the operation completed successfully. In between the command and status messages, the FSG 130 orchestrates the actual data transfer, honoring the handshakes between the client system 150 and the server system 110.

In further embodiments, if the amount of data to be transferred is large, it may be transmitted across the client and server fabrics 154 and 112 or server and storage fabrics 112 and 164 in multiple distinct bursts. Accordingly, the present invention pipelines the data bursts across the two fabrics. That is, it starts the data bursts in the receiving fabric, before all of the data bursts from the sending fabric are finished. In pipelining data, the gateway, FSG 130 or BSG 140, must honor the distinct flow control/handshake requirements of the protocols associated with each of the interconnection fabrics.

In another embodiment, the gateway, FSG 130 or BSG 140, for example, may also handle multiple in-progress commands concurrently. Thus, the gateway must be able to correctly map each data burst request, as well as the subsequent status report, to the correct IO command context.

In addition to relaying commands and status messages as described above, the FSG 130 also relays login/logout requests from the client system 150 to the server system 110. In general, the FSG 130 maps each login session of the client system 150 to exactly one login session of the server system 110. Similarly, the BSG 140 relays login/logout requests between the server system 110 and the storage system 160. This mapping of login requests is maintained in the login map 250, shown in FIG. 2A. For example, for each client login/logout request it receives, the FSG 130 performs a corresponding client system login/logout request to the server nodes 120, and subsequently relays the resulting status back to the client 152. If the server nodes 120 issues a logout directive to the FSG 130, a corresponding client logout directive is conveyed to the client 152.

In a further embodiment, the FSG 130 may also receive other low level requests on the client side, such as link services/extended link services and common transport commands. Such requests may be handled entirely by the FSG 130, in accordance with the standards of the protocol associated with the interconnection fabric 154, as they generally do not require explicit involvement from the server nodes 120.

In a further embodiment of the present invention, the gateway, FSG 130 or BSG 140, handles multiple exchanges concurrently. An exchange represents the communications that take place over the interconnection fabric, such as interconnection fabric 154, between an initiator, such as the client 152, and a target, such as the FSG 130, that issue and service a command. Exchanges include one or more sequences, which may flow in either direction between the initiator and the target. A sequence is a unit of flow control, including some number of frames.

For example, in a WRITE exchange, the XFER-RDY message (itself transmitted as a sequence) indicates to the initiator, the amount of data the target is prepared to receive. In turn, the initiator may transmit a sequence of frames to the target containing in total no more than the specified amount of data. In general, an exchange is identified uniquely by the initiator with an Originator Exchange ID (OX_ID), and uniquely by the target with a Responder Exchange ID (RX_ID). To manage the flow of information the gateway, FSG 130 or BSG 140, maintains a data exchange table 240, as shown in FIG. 2A, associated with each initiator. In an embodiment containing multiple gateways, each gateway maintains a distinct and independent set of data exchange tables.

By tracking the communication between the initiator and the target with a table, the gateway, FSG 130 or BSG 140, the target, is able to continue to accept new commands prior to the completion of servicing previously received commands. Accordingly, as the server nodes 120 returns with an RDMA request, data burst, or status message, the gateway, FSG 130 or BSG 140, is able to relay the corresponding information to the appropriate exchange.

As shown in FIG. 2B, in one embodiment of the present invention, the data exchange table 240 tracks the OX_ID, RX_ID, TAG, and Virtual Address information of each exchange. In a further embodiment in which the client networking system 150, shown in FIG. 1, is based on an Ethernet network, the data exchange table 240 tracks the Connection ID, Sink STag, Sink STagOffset, Source STag, Source STag Offset, Tag, and Virtual Address, for example.

In the first example, when a new exchange arrives, the FSG 130 assigns to it an RX_ID, a TAG, and Virtual Address information, and makes a corresponding entry in the table for the given initiator. The RX_ID is chosen such that it is unique to all currently pending operations between the given initiator and the FSG 130. The TAG is used to uniquely identify a remote direct memory access command, and thus must be chosen such that it is unique relative to all currently pending remote direct memory access operations between the FSG 130, and the corresponding remote direct memory access target, such as a server nodes 120. If the FSG 130 is connected to more than one remote direct memory access target within the server system 110, the FSG 130 may refer to the login map 250, as shown in FIG. 2A, to determine the particular target to use for commands coming from a given initiator.

The Virtual Address field in the gateway's data exchange table is a "handle" that the gateway provides in its remote direct memory access commands. These handles are subsequently used by the gateway to identify the appropriate exchange that corresponds to a particular remote direct memory access request. In one embodiment, the FSG 130 assigns an R-KEY for each login received from the client 152 in client system 150, that identifies access privileges and is unique relative to all other currently active logins. The same R-KEY may be used for all commands coming from an initiator within the current login session.

For example, for each command the FSG 130 may assign a range of Virtual Addresses, the size of which is at least equal to the total amount of data to be subsequently transferred based on the remote direct memory access command. The chosen address range should be unique within the range of addresses the FSG 130 has already assigned to other in-progress operations associated with a given initiator. In a further embodiment, the FSG 130 assigns an R-STAG for each command received from the client 152 that identifies a named buffer and associated access privileges. In another embodiment, the FSG 130 assigns a transfer offset identifying the number of bytes from the base of an associated named buffer.

As the FSG 130 relays the command to the server nodes 120, the {R-KEY, Virtual Address} tuple is supplied within the command to the target. When the target subsequently returns with an RDMA request specifying the given {R-KEY, Virtual Address}, the FSG 130 uses these handles to locate the appropriate exchange from the data exchange table 240, as shown in FIG. 2A, in order to marshal the corresponding data bursts in a pipelined/"cut-through" manner across the interconnection fabrics. In a further embodiment, a {R-STAG, Transfer Offset} tuple is supplied within the command to the target.

For example, in a Fibre Channel Protocol (FCP) WRITE operation, the FSG 130, upon receiving an RDMA READ request, issues an XFER-RDY message to the selected exchange, specifying a data size that is equal to that indicated in the RDMA READ request. As the corresponding data subsequently arrives from the FCP initiator, it is transmitted to the SRP target as soon as possible, using RDMA READ RESPONSE messages.

In an FCP READ operation, data bursts arriving via RDMA WRITE messages may be transmitted to the FCP initiator as soon as possible. Each RDMA WRITE may be relayed as one or more sequences to the FCP initiator.

In either case, if the SCSI target/RDMA originator in server nodes 120 should choose to split the data transfer into more than one distinct RDMA request, the FSG 130 must update the Virtual Address field, or R_STAG offset, in the data exchange table 240, shown in FIG. 2A, after each such RDMA transfer is finished. The new virtual address should reflect the next-expected address, so that subsequent RDMA requests associated with the given command can be matched up to the correct exchange in the data exchange table. Furthermore, in the case of an FCP WRITE command, FSG 130 shall issue a distinct XFER_RDY message to the FCP initiator for each such distinct RDMA READ request.

The SCSI target in server nodes 120 eventually returns a SCSI RESPONSE message to the FSG 130, containing a status report. This SCSI RESPONSE also contains the SCSI TAG, which was originally supplied by the FSG 130 in the SCSI command. Using this TAG, the FSG can locate, via the data exchange table 240, FIG. 2A, the appropriate FCP exchange into which a corresponding status report must be delivered. When the status has been delivered to the FCP initiator, the corresponding entry may be removed from the data exchange table 240, FIG. 2A.

In a further embodiment of the present invention, data flowing through the FSG 130 may be put through a small "elastic FIFO" before being injected into the egress fabric 114. On some occasions, the egress may be busy, and may be unable to keep up with the incoming data rate from the ingress fabric. Accordingly, the elastic FIFO expands to absorb the data that continues to arrive from its ingress port while the egress port is busy. According to one embodiment, the FIFO is implemented within the memory 230, shown in FIG. 2A, of the FSG 130.

For example, consider a large FCP READ operation, which causes the SCSI target in the server nodes 120 to issue a corresponding RDMA READ request to the FSG 130. Assume that the SCSI target issues an RDMA READ request for 1 GByte of data, for example. Accordingly, the FSG 130 may issue a corresponding XFER_RDY message to the FCP initiator, stating that it is ready to accept 1 GByte of data. However, if the server fabric should become congested at this point, the FSG 130 must be prepared to accept 1 GByte of data from the FCP initiator and must have enough internal memory for an elastic FIFO of that size. Therefore, in a further embodiment, the FSG 130 may impose some additional flow control within itself when relaying data between the two fabrics.

For example, in handling FCP WRITE commands, the FSG 130 may choose to issue one or more XFER_RDY messages for each RDMA READ request it receives. Specifically, if the RDMA READ request specifies an amount of data larger than what can be reasonably buffered within the FSG 130, the FSG 130 generates multiple XFER-RDY messages, each specifying only an amount of data that can be buffered in the FSG 130. the FSG 130 delivers each such XFER_RDY message to the FCP initiator only when sufficient resources are available within the FSG 130.

For example, the FSG 130 may translate a 1 MB RDMA request into two 512 KB XFER_RDY messages, because it contains only sufficient resources for an elastic FIFO of at most 512 KB. Note that while the FCP initiator is required by the SCSI standard to supply the requested data in a single sequence, the FSG 130 may deliver the data to the SCSI target using multiple RDMA READ RESPONSE packets, in compliance with the MTU (maximum transfer unit) constraints of the respective standards.

In handling FCP READ commands, the FSG 130 may need to apply back pressure on an SCSI target that is sending data to it using RDMA WRITE operations. To accomplish this in one embodiment, the FSG 130 may take advantage of the Packet Sequence Number (PSN) and ACK/NAK protocol in the InfiniBand standard.

In general, every packet transmitted between IB ports is associated with a PSN. The value of these PSNs are incremented for each packet. For RDMA operations, each PSN is acknowledged by the RDMA responder, either explicitly or implicitly, when it completes the necessary action associated with the packet. In general, the RDMA originator is allowed only a window of PSNs that can remain unacknowledged at any time, and must not issue more RDMA WRITE operations until the previous PSNs have been acknowledged. Furthermore, each RDMA WRITE packet is not allowed to exceed a certain MTU size, which is negotiated between the RDMA originator and responder upon initialization. (See InfiniBand specification for more detailed descriptions).

Hence, the FSG 130 may impose back pressure on the RDMA originator by withholding acknowledgments for the outstanding PSNs from the originator. Furthermore, the FSG 130 may negotiate an MTU size and a PSN window with the SCSI target, such that the available resources are sufficient to absorb the outstanding window of RDMA WRITE packets from the SCSI target, should the client-side fabric become congested.

In a further embodiment, a login map 250, as shown in FIG. 2A, is used to determine how client or storage device and server login sessions are mapped to each other. In an embodiment in which the FSG 130 is connected to multiple server nodes 120, each client login is associated with one of the multiple server nodes 120 (because each client login causes exactly one server login by the FSG 130). This choice is determined by the user (or by some configuration software entity), and is specified in the login map. A separate login map is maintained by each FSG 130. FIG. 2C shows a detailed view of the login map 250, according to one embodiment of the present invention.

At initialization, the user or configuration software provides the gateway with a list of authorized initiators, such as clients 152, and the server targets, such as server nodes 120, that each initiator is allowed to access. In one embodiment, client initiators are identified by their port world-wide unique names (Port WWNs), while server-side targets are identified by globally unique identifiers (GUID). The S_ID, R_KEY, and data exchange table pointer fields are initially empty. In a further embodiment, in which an Ethernet network and Infiniband network are interconnected, the login table would include entries for Connection ID, server-side target, R-Key, and data exchange table pointer.

When the FSG 130 receives a login request from a client-side initiator, such as client 152, for example, it searches the login map 250, as shown in FIG. 2A, for a matching Port WWN. If a match cannot be found, the client-side initiator is considered to not have permission to access storage server nodes 120, and the login request is rejected. If a match is found, the FSG 130 performs a server-side login request to the specified server-side target, server nodes 120, for example. During the server-side login request, the FSG 130 relays the login parameters supplied by the original client-side login request. If the server-side target accepts the server-side login request, FSG 130 accepts the client-side login request accordingly. Otherwise, the client-side login request is rejected.

In accordance with an embodiment of the present invention, the client-side initiator is expected to supply a source identifier (S_ID) in the login request. The S_ID (instead of Port WWN) is used by the client-side initiator to identify itself in all subsequent requests within the current login session. If the login is successful, this S_ID is entered into the login map 250, FIG. 2A. The FSG 130 also generates an R-KEY for this login session, and initializes a new data exchange table 240, as shown in FIG. 2A, for this client-side initiator, as described earlier.

The FSG 130 relays all subsequent commands from the client-side initiator to the server-side target associated with the given S_ID. When the client-side initiator eventually logs out of the FSG 130, either explicitly (e.g. due to a logout request from the client-side initiator), or implicitly (e.g. due to the client-side link being severed), the FSG 130 resets the corresponding entry in the login map 250, FIGS. 2A and 2C. The Port WWN and server-side target GUID fields are left unchanged, but the S_ID and R_KEY fields are erased, and the corresponding data exchange table is deleted. By destroying the R_KEY and deleting the data exchange table, all in-progress operations related to the now logged-out client-side initiator will fail when the server-side target attempts to cause a data transfer or return a status for such operations.

To avoid a race condition, a recently revoked R_KEY must not be reassigned to another login session for a specified time period. The FSG 130 holds the revoked R-KEY on a reserved list, and will not reuse it until a period of time has elapsed, such that all operations related to the terminated login session have completed successfully or failed.

As shown in FIGS. 3 through 6, the current invention provides various methods for managing the reading and writing of data across multiple platforms. Within each method a module controls the flow of command and status message, and orchestrates the data transfer, honoring the handshakes required for the protocols associated with the interconnection fabrics on both sides of the module.

Figure 3:
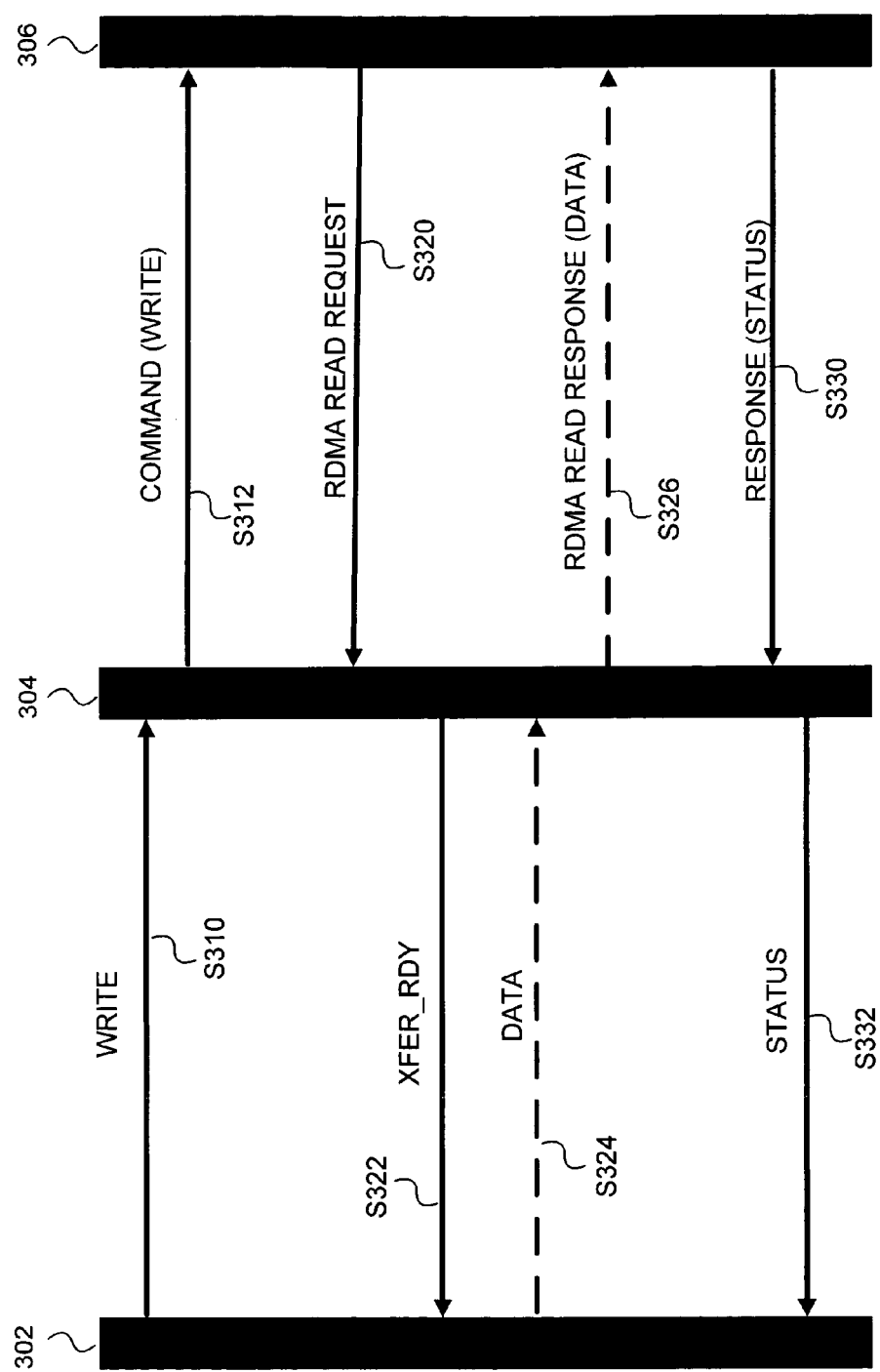
FIG. 3 is a flow diagram showing a method for writing data from a first networking system to a second networking system, according to an embodiment of the present invention.

Turning to FIG. 3, a flow diagram is provided showing a method for writing data from a network module, such as a client, according to an embodiment of the present invention. The process of writing data begins with step S310 when a first module 302, such as a client, initiates a write operation by sending a write request to a second module 304, such as an FSG.

In step S312, the second module 304 translates the write request, if necessary, and initiates a write command to a third module 306, such as a server node. In step S320, the third module 306 sends a remote direct memory access read request instructing the second module 304 to send the data. In step S322, the second module 304 returns a transfer ready message to the first module 302 confirming that the second module 304 is ready to receive the data.

The writing process continues in step S324 with the first module 302 transferring the data to the second module 304. In step S326, the second module 304 transfers the data to the third module 306 with a remote direct memory access read response. In a further embodiment, the second module 304 may buffer the data prior to transferring to the third module 306. Next, in step S330, the third module 306 responds to the second module 304 with a status response indicating the status of the data transfer to the third module 306. The process ends in step S332 with the second module 304 passing the status of the data transfer to the first module 302.

In a further embodiment in which a remote direct memory access protocol is available between the first module 302 and the second module 304, the second module 304 would return a remote direct memory access read request in step S322. In this particular embodiment, the first module 302 would respond to step 322 with a remote read response with the requested data in step S324.

In another embodiment of the present invention in which a remote direct memory access protocol is not used between the second module 304 and the third module 306, in step S312, the second module sends a write request. In step S320, the third module returns a transfer ready message. In step S326, the second module 304 transfers the specified data to the third module 306. In step S330, the third module provides a status message indicating the results of the data transfer in step S326.

Figure 4:
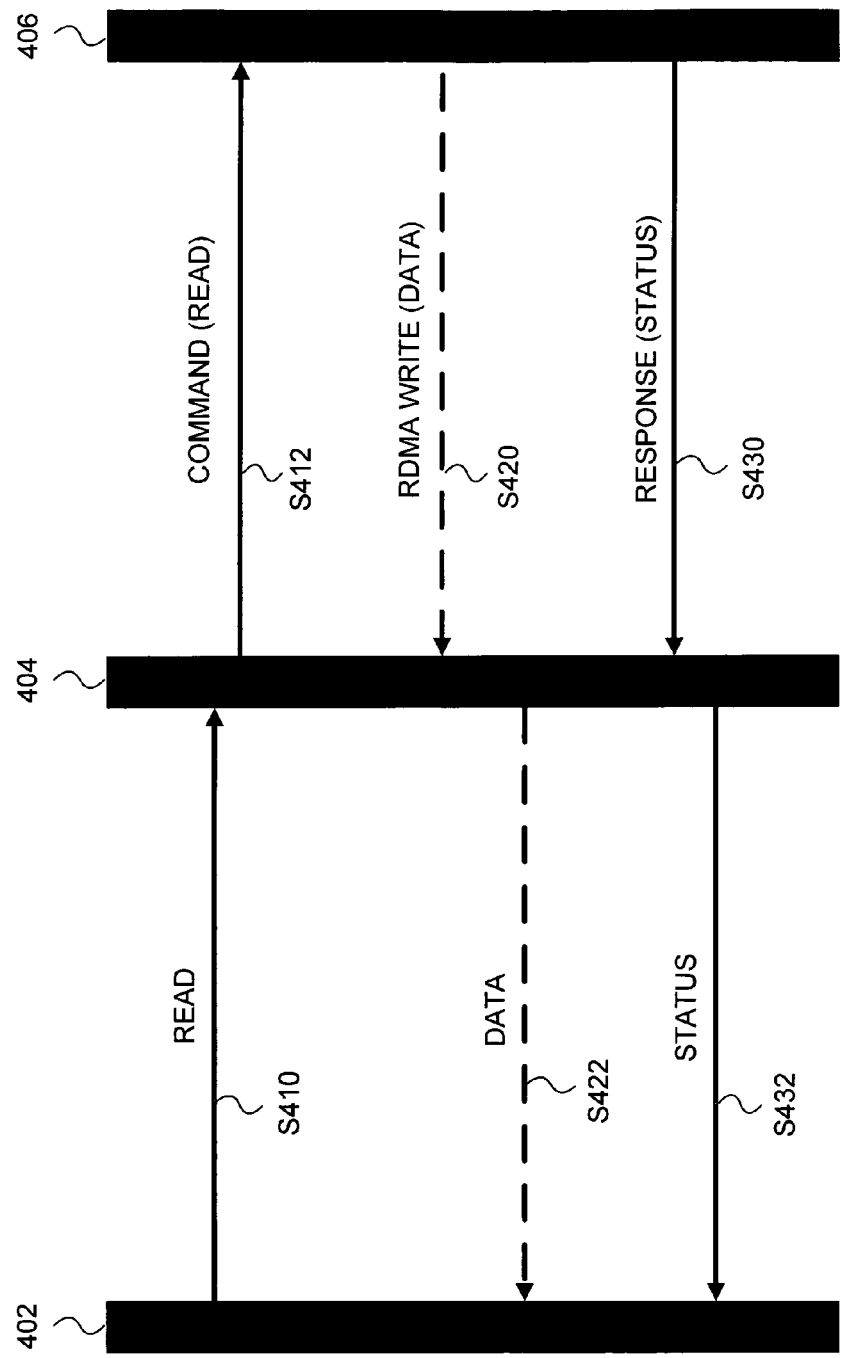
FIG. 4 is a flow diagram showing a method for reading data by the a first networking system from a second networking system, according to an embodiment of the present invention.

FIG. 4 shows a flow diagram describing a method for reading data by a network module, such as a client module, according to an embodiment of the present invention. The process of reading data begins in step S410 with a first module 402 sending a read request to a second module 404. In step S412, the second module translates the read request, if necessary, and sends a read command to a third module 406. In step S420, the third module 406 returns the requested data to the second module 404 with a remote direct memory access write operation. In step S422, the second module 404 writes the data to the first module 402.

In step S430, the third module 406 also responds to the second module 404 with a status response message indicating the status of the remote direct memory access write operation. In step S432, the second module 404 returns a status report to the first module 402.

In a further embodiment in which a remote direct memory access protocol is available between the first module 402 and the second module 404, the second module 404 would return a remote direct memory access write operation with the requested data in step S422.

In another embodiment of the present invention in which a remote direct memory access protocol is not used between the second module 404 and the third module 406, the second module sends a read request in step S412. In step S420, the third module 406 transfers the data. In step S430, the third module 406 provides a status message indicating the results of the data transfer in step S420.

Figure 5:
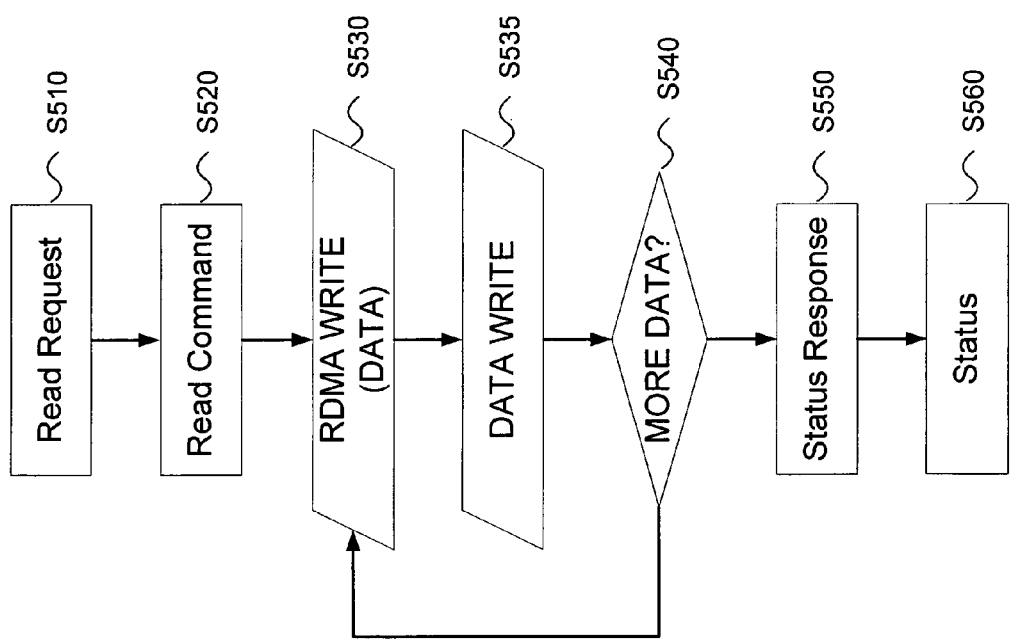
FIG. 5 is a flow diagram showing a method for pipelining data bursts, according to an embodiment of the present invention.

FIG. 5 is a flow diagram showing a method for pipelining data bursts according to an embodiment of the present invention. Turning to FIG. 5, a read command is used to illustrate the method, which begins in step S510, whereby a requesting module sends a read request for a specified amount of data. In step S520 the read request is translated, if necessary, and a read command for the specified amount of data is passed. In step S530, a remote direct memory access write request is used to transfer all or part of the specified amount of data requested by the read command of step S520. In step S535, data received from the remote direct memory write request of S530 is written to the requesting module. In step S540, if the specified amount of data requested in step S510 has not been retrieved, the process returns to step S530 to retrieve another block of data. It is noted that according to the present invention, the data received from each step S530 may be pipelined by passing the data in step S535 before all of the remote direct memory write operations in step S530 have been completed. According to a further embodiment, the data received from each step S530 may be queued in an elastic FIFO to allow adjustment to the timing of the data flow based on any latencies within the system implementing this method. In an embodiment of the present invention in which multiple blocks of data are retrieved for a single data request for a large amount of data, the multiple blocks of data are typically returned in order to ensure the host ordering requirements of the data transfer.

Once the specified amount of data has been retrieved, the process moves to step S550 in which a status response is sent indicating whether or not the specified amount of data has been transferred correctly. The process is completed in step S560 with a status message indicating the result of the write operations.

Figure 6:
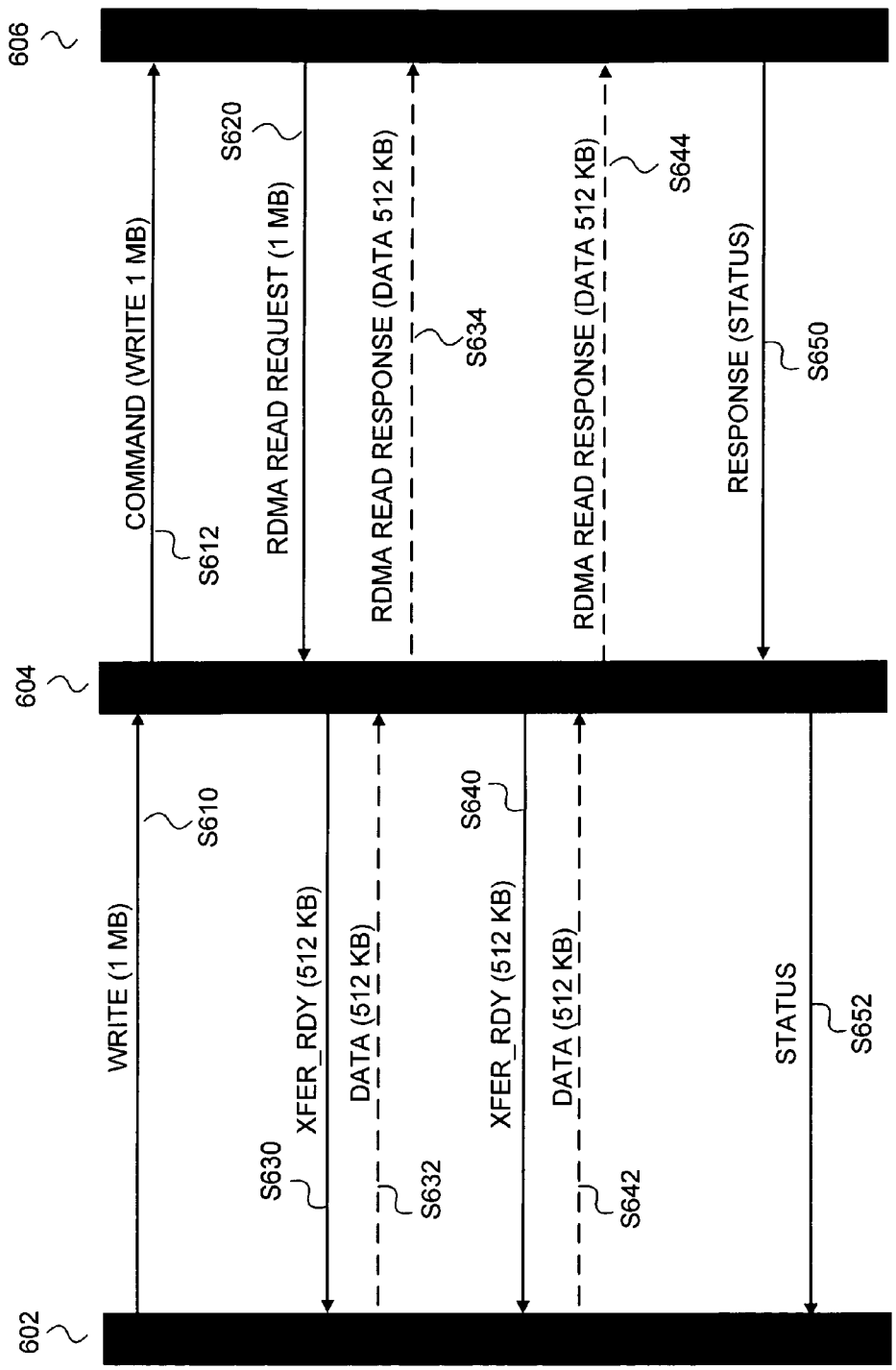
FIG. 6 is a flow diagram showing a method for writing data using an elastic FIFO, according to an embodiment of the present invention.

Similarly, FIG. 6 provides a flow diagram showing a method for writing multiple data packets, according to an embodiment of the present invention. In FIG. 6, a write request of 1 MB of data is managed by passing two 512 KB packets. The process begins in step S610 with the first module sending a write request for a specified amount of data, 1 MB, for example. In step S612, the second module 604 converts the write request, if necessary, to a write command and passes the write command to a third module 606. In step S620, the third module 606 responds to the write command with a remote direct memory access read request for 1 MB of data. In step S630, the second module sends a first transfer ready message for 512 KB of data. In step S632, the first module responds 512 KB of the requested data. In step S634, the second module responds with a remote direct memory access read response to the third module 606 with the 512 KB of data.

In step S640, the second module 604 requests the next section of data by sending a transfer ready message for the next 512 KB of data. In step S642, the first module responds with the 512 KB of data. In step S644, the second module 604 responds with a remote direct memory access read response with the 512 KB of data. Upon completion of the transfer of all data, the third module 606 responds in step S650 with a status response message. In step S652, the second module 604 passes a status response message to the first module 602.

While various embodiments of the present invention have been described in terms of iSCSI and using the front-side gateway it should be clear to one skilled in the art that the current invention is equally applicable to other transport protocols implementing a remote direct memory access protocol, as well as communications through a back-side gateway. It will also be apparent to those skilled in the art that various modifications and variations can be made in the present invention without departing from the spirit or scope of the invention. Thus, it is intended that the present invention covers the modifications and variations of this invention provided that they come within the scope of any claims and their equivalents

What is claimed is:

1. A method for processing a data write request using multiple communication protocols, comprising the steps of:
   receiving, by a gateway module from a requesting module, a first write request for writing data to a network node;
   converting the first write request to a second write request, wherein the converting comprises translating the first write request from a first communication protocol associated with the requesting module to a second communication protocol associated with the network node, and wherein the first and second communication protocols are different;
   passing, from the gateway module to the network node, the second write request;
   generating, by the network node, a first transfer request based upon the first write request;
   passing, by the network node to the gateway module, the first transfer request;
   generating one or more second transfer requests by the gateway module, wherein the generating comprises translating the first transfer request from the second communication protocol to the first communication protocol;
   passing, by the gateway module to the requesting module, the one or more second transfer requests;
   passing, by the requesting module to the gateway module, the data specified in each of the one or more second transfer requests with one or more corresponding first data transfer messages;
   generating one or more corresponding second data transfer messages by the gateway module, wherein the generating comprises translating the one or more first data transfer messages from the first communication protocol to the second communication protocol;
   passing, by the gateway module to the network node, the specified data from each of the one or more first data transfer messages with the one or more corresponding second data transfer messages;
   responding, by the network node to the gateway module, with a first status message to the gateway module indicating the result of the step of passing the specified data;
   converting, by the gateway module, the first status message to a second status message, wherein the converting comprises translating the first status message from the second communication protocol to the first communication protocol; and
   sending, from the gateway module to the network node, a second status message by the gateway based on the first status message.

2. The method of claim 1, wherein the step of receiving a first write request further comprises the step of receiving a write command, and the step of passing the one or more second transfer requests further comprises the step of passing one or more transfer ready messages.

3. The method of claim 1, wherein the step of generating a first data transfer request further comprises generating a transfer ready message.

4. The method of claim 1, wherein the step of receiving a first write request further comprises receiving a write command, the step of generating one or more second transfer requests further comprises generating one or more remote direct memory access read requests, the step of passing the data specified with one or more second transfer requests further comprises passing the specified data with one or more remote direct memory read responses, the step of sending a second status message further comprises sending a status response message.

5. The method of claim 1, wherein the step of converting the first write request further comprises converting the first write request to a write command, the step of generating a first transfer request further comprises generating a remote direct memory read request, the step of passing the specified data with one or more second data transfer messages further comprises passing the specified data with one or more remote direct memory read responses, and the step of responding with a first status message further comprises responding with a status response message.

6. A method for processing a data read request across multiple interconnection fabrics, comprising the steps of:
   receiving, by a second network module from a first network module, a first read request for reading specified data from a third network module, wherein the first network module is located on a first interconnection fabric and the third network module is located on a second interconnection fabric, wherein the first and second interconnection fabrics are different, and wherein the second network module is connected between the first and third network modules via the first and second interconnection fabrics;
   converting, by the second network module, the first read request to a second read request;
   passing, by the second network module to the third network module, the second read request;
   responding, from the third network module to the second network module, with one or more first data transfer messages with the specified data identified in the first read request;
   generating, by the second network module, one or more second data transfer messages for each of the one or more first data transfer messages;
   passing, from the second network module to the first network module, the one or more second data transfer messages;
   responding, from the third network module to the second network module, with a first status message indicating the result of the step of responding with one or more first data transfer messages; and
   sending, from the second network module to the first network module, a second status message based on the first status message.

7. The method of claim 6, wherein the step of converting the first read request further comprises converting the first read request to a read command, the step of responding with one or more first data transfer messages further comprises responding with one or more remote direct memory access write requests, and the step of responding with a first status message further comprises responding with a status response message.

8. The method of claim 6, wherein the step of receiving a first read request further comprises receiving a read command, the step of responding with one or more second data transfer messages further comprises responding with one or more remote direct memory write requests, the step of sending a second status message further comprises sending a status response message.

9. A method for processing a data read request, comprising the steps of:
   receiving, by a gateway module, a read request for specified data;
   converting, by the gateway module, the read request to a read command;
   determining an amount of the specified data that can be sent in a remote direct memory access write command;
   generating a remote direct memory access write command based on the step of determining the amount of the specified data;
   sending, to the gateway module, the remote direct memory access write command;
   writing, by the gateway module, the data received in the step of sending the remote direct memory access write command;
   determining if all of the specified data has been sent;
   repeating the steps of generating a remote direct memory access write command, sending the remote direct memory access write command, and writing the data received, if all of the specified data has not been sent;
   responding, to the gateway module, with a status response indicating the status of the direct memory access write commands; and
   passing, by the gateway module, a status message indicating the status of the direct memory access write commands.

10. A method for processing a data write request, comprising the steps of:
   sending, from a requesting module to a gateway module, a write request for specified data;
   converting the write request to a write command;
   responding, by the network node to the gateway module, with a remote direct memory access read request for the specified data;
   determining, by the gateway module, an amount of the specified data that can be retrieved in a single data burst;
   issuing, by the gateway module to the requesting module, one or more data requests, each for an amount of data that is equal to or less than the amount of the specified data that can be retrieved in a single data burst, wherein a total amount of data requested in the one or more data requests equals the specified data;
   writing, in one or more data bursts from the requesting module to the gateway module, the data requested in each of the one or more data requests;
   generating, by the gateway module to the network node, one or more remote direct memory access read commands with the data received in each data burst, wherein the generating of the one or more remote direct memory access read commands occurs before all of the one or more data bursts are written to the gateway module;
   responding, from the network node to the gateway module, with a status response indicating the status of the direct memory access read commands; and
   passing, by the gateway module to the requesting module, a status message indicating the status of the direct memory access read commands.

* * * * *